US010922745B2

(12) United States Patent
Williams et al.

(10) Patent No.: US 10,922,745 B2
(45) Date of Patent: Feb. 16, 2021

(54) SYSTEMS AND METHODS FOR MACHINE-BASED MATCHING OF LODGING INVENTORY FROM DISPARATE RESERVATION PROVIDER SYSTEM (71) Applicant: TravelPass Group, LLC, Lehi, UT (US)

(72) Inventors: Ryan Williams, Lehi, UT (US); Ryan McCoy, Lehi, UT (US); Daniel Nelson, Lehi, UT (US); Neil Valentine, Lehi, UT (US); Scott Jensen, Lehi, UT (US)

(73) Assignee: TravelPass Group, LLC, Lehi, UT (US)

( * ) Notice: Subject to any disclaimer, the term of this patent is extended or adjusted under 35 U.S.C. 154(b) by 256 days.

(21) Appl. No.: 16/042,605

(22) Filed: Jul. 23, 2018

(65) Prior Publication Data

US 2019/0035009 A1 Jan. 31, 2019

Related U.S. Application Data (60) Provisional application No. 62/536,781, filed on Jul. 25, 2017.

(51) Int. Cl.
*G06Q 30/06* (2012.01)
*G06Q 50/12* (2012.01)
(Continued)

(52) U.S. Cl.
CPC ..... *G06Q 30/0643* (2013.01); *G06F 16/9535* (2019.01); *G06Q 10/02* (2013.01);
(Continued)

(58) Field of Classification Search
CPC ................................................ G06Q 30/06–08
(Continued)

(56) References Cited

U.S. PATENT DOCUMENTS 6,990,457 B1 * 1/2006 Litman .................. G06Q 10/02
705/5
7,076,451 B1 7/2006 Coupland et al.
(Continued)

FOREIGN PATENT DOCUMENTS

WO WO2019023361 1/2019

OTHER PUBLICATIONS

Correlation-based Feature Selection for Machine Learning, Mark A. Hall, Apr. 1999 (Year: 1999).*

*Primary Examiner* — Ming Shui
(74) *Attorney, Agent, or Firm* — Ray Quinney & Nebeker P.C.; Paul N. Taylor (57) ABSTRACT Systems and methods for machine-based matching of lodging inventory from a plurality of disparate reservation provider systems address the difficulties inherent in comparing prices to obtain a lowest possible price, which difficulties are inherent in the distribution of inventory to multiple third-party reservation providers who are generally permitted to utilize their own naming conventions when describing lodging inventory and who are also free to at least some extent to set prices for the various lodging inventory within their control. The systems and methods match room types using information obtained from the multiple third-party reservation providers, whereby direct comparisons can be made between prices for the same room types even when the reservation providers do not utilize identical descriptions or naming conventions for the respective room inventories.

17 Claims, 3 Drawing Sheets (51) Int. Cl.
*G06Q 10/02* (2012.01)
*G06F 16/9535* (2019.01)
(52) U.S. Cl.
CPC ..... *G06Q 30/0629* (2013.01); *G06Q 30/0633* (2013.01); *G06Q 50/12* (2013.01)
(58) Field of Classification Search
USPC .............................................. 705/26.1–27.2
See application file for complete search history.

(56) References Cited

U.S. PATENT DOCUMENTS

| | | | |
|---|---|---|---|
| 9,547,878 B1 | 1/2017 | Kerr | |
| 2007/0067193 A1* | 3/2007 | Robertson | G06Q 10/02 705/5 |
| 2009/0030743 A1* | 1/2009 | Tussy | G06Q 10/02 705/5 |
| 2009/0271281 A1* | 10/2009 | Kang | G06Q 30/0601 705/26.1 |
| 2012/0221363 A1* | 8/2012 | Slowe | G06Q 50/12 705/5 |

* cited by examiner

SYSTEMS AND METHODS FOR MACHINE-BASED MATCHING OF LODGING INVENTORY FROM DISPARATE RESERVATION PROVIDER SYSTEM

CROSS-REFERENCED APPLICATIONS

This application claims priority to United States Provisional Patent Application No. 62/536,781 filed Jul. 25, 2017 and entitled "Systems and Methods for Machine-Based Matching of Lodging Inventory from Disparate Reservation Provider Systems".

BACKGROUND OF THE INVENTION

1. Field of the Invention

The present invention relates to temporary lodging systems, and more particularly to systems and methods for machine-based matching of lodging inventory from disparate reservation providers despite differences in description of comparable inventory.

2. Background and Related Art

In the lodging industry, as with many industries, it is generally desirable to maximize profit. In general, profit is maximized when lodging facilities are operating at or near capacity. Accordingly, lodging providers are incentivized to maximize their occupancy, and one way in which lodging facilities maximize occupancy is to distribute reservation inventory to a number of outside reservation providers in addition to any in-house efforts to obtain reservations at the properties. By way of example, a particular lodging provider may distribute a portion of its available reservation inventory through a number of channels including online travel agencies ("OTAs") such as Expedia, Priceline, Travelocity, Orbitz, and the like, wholesalers and business-to-business reservation systems such as the Global Distribution System (GDS), Sabre, Amadeus, Galileo, Pegasus, and Worldspan, and aggregators who collect information about reservation inventory from multiple of such sources.

Lodging providers such as hotels benefit from the distribution of reservation inventory to multiple suppliers because they are able to reach a greater number of interested consumers that might not encounter the lodging provider in their search for accommodations if they were only to search using a single source. By having inventory available with many or even all reservation providers, lodging providers are able to maximize the possibility that they will be able to book reservations for the greatest possible number of rooms and thereby maximize their revenue and profits.

In general, however, each channel through which lodging inventory may be reserved and supplied is managed by a separate channel manager, who is often free to vary room descriptions and rates within certain bounds and from day to day, as opportunity or necessity dictates. Accordingly, the descriptions and rates for identical rooms or room classes can vary between the various reservation providers. For example, a strictly business-to-business reservation provider often uses very sparse information when describing available rooms in its lodging inventory, because customers of such providers often do not require more than the most basic information when booking lodging accommodations. In contrast, business-to-consumer oriented channels often include much more information about available lodging inventory, including pictures and narrative room descriptions. In general, the reservation providers are free to communicate as much information about the inventory as they wish in whatever manner they wish. Descriptions can vary in the room titles (e.g., "single king suite," vs. "junior suite," vs. "deluxe suite," etc.). Descriptions of amenities (e.g., wireless Internet access, food, exercise equipment, or any other amenities) can also vary or even be omitted by certain reservation providers. Many reservation providers provide reservation opportunities for many different lodging facilities, properties, and lodging providers, and the reservation providers may wish to have their property descriptions (e.g., on their website) be consistent, even when describing lodging facilities operated by a variety of other entities. This consistency may facilitate consumer comparison between various lodging facilities or properties on the reservation provider's site.

That said, consumers often wish to obtain the best possible rate for the room or room class of interest to them. When a consumer places a reservation at a lodging facility, he or she does not typically reserve a specific room, but rather one of the available rooms in a certain room class (i.e., a room having a certain size, a certain number and size of beds, certain facilities and amenities, etc.), and the specific room is only assigned to the consumer shortly before or on arrival. This allows flexibility to the lodging provider, to account for and manage last-minute bookings as well as inevitable no-shows. As the lodging provider distributes its inventory to multiple reservation providers, each of which may receive a portion of the inventory of a room class type, it becomes difficult for consumers to understand and know whether inventory on two different reservation providers is comparable because the descriptions of such inventory can vary greatly between reservation providers.

Accordingly, it is very difficult for an ordinary consumer to ensure that he or she is getting the best available lodging rate. What may look like an attractive rate through one OTA when compared with rates available through other OTAs, may in fact be associated with an inferior room class, and thus not be a comparable rate. There is no way in which an ordinary consumer has any realistic ability to parse through numerous reservation channels, all with varying room class descriptions, and to then know that the rate he or she is paying is the minimum possible rate for a desired room or room class. Indeed, some lodging properties and facilities may have as many as eighty or more different room classes. The difficulties encountered by the average consumer are further limited by the realities of limited inventory. Even if a consumer could take the time to accurately compare rooms and rates described using different descriptions on different reservation provider systems, by the time the consumer did so, some of the rates would become outdated before the comparison was complete as inventory changes due to ongoing reservations and cancellations.

Existing computer systems have proved inadequate at addressing these difficulties. Because the room descriptions on differing reservation providers can vary so greatly, existing computer systems have not proven capable of properly matching room types across varying providers. Accordingly, there is an unmet need to provide systems and methods that can provide room type matching across a multitude of disparate reservation providers to ensure that consumers are comparing equivalent rooms from different providers and are able to obtain the lowest possible rates for their lodging.

BRIEF SUMMARY OF THE INVENTION

Implementation of the invention provides systems and methods for machine-based matching of lodging inventory from a plurality of disparate reservation provider systems. Lodging inventory can be any type of inventory at any lodging provider, including hotels, motels, bed and breakfasts, hostels, campsites, and the like. While individual lodging properties or facilities are often managed by a single entity (e.g., a hotel or motel owner or managing company, etc.), and most lodging properties can be booked directly with the owner or manager of such properties, many lodging providers also distribute at least a portion of their reservation inventory to multiple outside third party reservation providers to maximize revenue of the lodging facility or property. In general, it is advantageous for the lodging facility to maximize exposure and the number of channels through which its inventory is sold such that a greater number of interested consumers have an opportunity to encounter the property or facility in searches (e.g., Internet searches) for lodging. Implementations of the invention address the difficulties inherent in comparing prices to obtain a lowest possible price, which difficulties are inherent in the distribution of inventory to multiple third-party reservation providers who are generally permitted to utilize their own naming conventions when describing lodging inventory and who are also free to at least some extent to set prices for the various lodging inventory within their control.

Accordingly, implementation of the invention provides systems and methods for machine-based matching of lodging inventory from a plurality of disparate reservation provider systems. According to certain implementations of the invention, a machine-based system is provided for correlating room types at a particular lodging facility using disparate information stored on various disparate network-connected lodging reservation provider computer systems. The system includes a network interface at least intermittently communicatively connected with a plurality of disparate network-connected lodging reservation computer systems over a network, the network interface receiving from the plurality of lodging reservation computer systems provider-formatted information sets. Each provider-formatted information set includes information identifying one of a plurality of rooms available for rent at a particular lodging facility, information identifying a price to rent that room, and information identifying a lodging reservation computer system offering that room at that price. The system also includes a first memory store configured to receive and store the provider-formatted information sets and a second memory store containing a database having a plurality of room definition sets defining characteristics of different classes of rooms available at the particular lodging facility. The system further includes a correlation system configured to access the memory stores and utilize information contained within the provider-formatted information sets and the room definition sets to correlate each of the provider-formatted information sets with one of the room definition sets. The correlation system is further configured to group provider-formatted information sets correlating with identical room definition sets together into individual groups. The system also includes a comparison system configured to compare the prices of all provider-formatted information sets within each individual group, to identify a lowest price within each individual group, and to output an identification of the provider-formatted information set and information from the room definition set correlated with the group as a room within each available room class having the lowest available price.

According to certain implementations, the machine-based system further includes a room information system configured to parse the provider-formatted information sets and information from the room definition set for an available room class and to output a consumer-ready room description for the available room class using most-detailed information from among the provider-formatted information sets and the room definition set and using the lowest available price. The system may be configured to update the room definition set when the most-detailed information does not match the room description in the room definition set. In some instances, at least a portion of the consumer-ready room description is drawn from a provider-formatted information set not having the lowest price within that particular group.

The system may also include a consumer interface configured to receive a query from a consumer computing device and to output a price and description for the room within a room class having the lowest available price in response to the query from the consumer computing device. The system may be configured to output prices and descriptions for each room within a plurality of available room classes having the lowest available price for such room classes. When the system receives the query from the consumer computing device, the system may obtain the provider-formatted information sets, correlate and group the provider-formatted information sets into groups, and compare prices within each group, outputting prices and descriptions for the room in a plurality of available room classes having the lowest available price based on prices and availability information obtained within a few tens of seconds of receipt of the query from the consumer computing device, or in other words in real time or near-real time.

The system may include a reservation system that receives a selection of a room and consumer-identifying information from the consumer computing device, establishes a reservation connection with a low-price lodging reservation computer system associated with the lowest price for the room identified in the selection received from the consumer computing device, and places a reservation for the room with the low-price lodging reservation computer system using the consumer-identifying information. The system may be further configured to obtain updated provider-formatted information sets at least once after the reservation has been placed, identify available rooms within the same or better room class as the room class of the reservation using the correlation system, and identify rates available through various lodging reservation computer systems for the same or better room class using the comparison system to determine whether a room of the same or better room class of the reservation is available on the same date as the reservation but at a price lower than the price of the reservation. When a room of the same or better room class of the reservation is available on the same date as the reservation but at a price lower than the price of the reservation, the system may place a new reservation for the same date and same or better room class but at the lower price, and cancel the reservation previously made at the higher price.

The correlation system may include a machine-learning system trained on a data set of known correlations between a plurality of provider-formatted information sets and a plurality of room definition sets. The database in the second memory store of the system may include a historical listing of naming conventions identified as having been used by any of the plurality of lodging reservation provider computer systems for each room definition. The database in the second memory store may also include a historical track of prices for each room definition for each lodging reservation provider computer system. The system may be configured to update the historical listing of naming conventions when a changed naming convention is identified for one or more of the provider-formatted information sets. The system may also be configured to update the historical track of prices as varying prices are identified from the provider-formatted information sets.

Alternate implementations of the invention provide a method for correlating room types using disparate information stored on various network-connected lodging reservation provider computer systems. The method may include connecting, over a computer network, to a plurality of disparate network-connected lodging reservation computer systems and obtaining, from the lodging reservation computers systems, a plurality of provider-formatted information sets. Each provider-formatted information set may include information identifying one of a plurality of rooms available for rent at a particular lodging facility, information identifying a price to rent that room, and information identifying a lodging reservation computer system offering that room at that price. The method may also include steps of storing the plurality of provider-formatted information sets in a first memory store of a computing device implementing the method for correlating room types and accessing a database in a second memory store of the computing device to obtain a plurality of room definition sets defining characteristics of different classes of rooms available at the particular lodging facility. The method may also include utilizing information contained within the provider-formatted information sets and the room definition sets to correlate each of the provider-formatted information sets with one of the room definition sets, grouping provider-formatted information sets correlated with identical room definition sets together into individual groups, and comparing the prices between the provider-formatted information sets within each individual group, identifying a lowest price within each individual group, and outputting the provider-formatted information set and information from the room definition set correlated with the group as a room within each available room class having the lowest available price.

The method may further include steps of parsing the provider-formatted information set and information from the room definition set for an available room class and outputting a consumer-ready room description for the available room class using most detailed information from among the provider-formatted information sets and the room definition set and the lowest available price. The method may also include a step of updating the room definition set when the most-detailed information does not match the room description in the room definition set. At least a portion of the consumer-ready room description may be drawn from a provider-formatted information set not having the lowest price within that particular group.

The method may also include receiving a query from a consumer computing device and outputting a price and description for the room within a room class having the lowest available price in response to the query from the consumer computing device. In some instances, the method includes outputting prices and descriptions for each room within a plurality of available room classes having the lowest available price for such room classes. The provider-formatted information sets may be obtained, correlated and grouped into groups, the prices within each group may be compared, and prices and descriptions for each room in a plurality of available room classes having the lowest available price in its respective room class may be outputted to the consumer computing device, all within a few tens of seconds of receipt of the query from the consumer computing device. In other words, these steps may be performed in real time or near-real time.

The method may include steps of receiving a selection of a room and consumer-identifying information from the consumer computing device, establishing a reservation connection with a low-price lodging reservation computer system associated with the lowest price for the room identified in the selection received from the consumer computing device, and placing a reservation for the room with the low-price lodging reservation computer system using the consumer-identifying information. The method may also include steps of obtaining updated provider-formatted information sets at least once after the reservation has been placed, identifying available rooms within the same or better room class as the room class of the reservation, and identifying rates available through various lodging reservation computer systems for the same or better room class by determining whether a room of the same or better room class of the reservation is available on a same date as the reservation but at a price lower than the price of the reservation. When a room of the same or better room class as the reservation is available on the same date as the reservation but at a price lower than the price of the reservation, a new reservation may be placed for the same date and the same or better room class but at the lower price and the reservation previously made at the higher price may be canceled.

The method may utilize a machine-learning system trained on a data set of known correlations between a plurality of provider-formatted information sets and a plurality of room definition sets. In the method, the database in the second memory store of the computing device may include a historical listing of naming conventions identified as having been used by any of the plurality of lodging reservation provider computer systems for each room definition. The database may also include a historical track of prices for each room definition for each lodging reservation provider computer system. The method may further include steps of updating the historical listing of naming conventions when a changed naming convention is identified for one or more of the provider-formatted information sets and updating the historical track of prices as varying prices are identified from the provider-formatted information sets.

It is anticipated that implementation of the invention will be of special utility to aggregators who aggregate lodging information from a variety of lodging reservation providers to provide consumers with opportunities to purchase lodging reservations and the like at a lowest possible cost.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide systems and methods for machine-based matching of lodging inventory from a plurality of disparate reservation provider systems. Lodging inventory can be any type of inventory at any lodging provider, including hotels, motels, bed and breakfasts, hostels, campsites, and the like. While individual lodging properties or facilities are often managed by a single entity (e.g., a hotel or motel owner or managing company, etc.), and most lodging properties can be booked directly with the owner or manager of such properties, many lodging providers also distribute at least a portion of their reservation inventory to multiple outside third party reservation providers to maximize revenue of the lodging facility or property. In general, it is advantageous for the lodging facility to maximize exposure and the number of channels through which its inventory is sold such that a greater number of interested consumers have an opportunity to encounter the property or facility in searches (e.g., Internet searches) for lodging. Embodiments of the invention address the difficulties inherent in comparing prices to obtain a lowest possible price, which difficulties are inherent in the distribution of inventory to multiple third-party reservation providers who are generally permitted to utilize their own naming conventions when describing lodging inventory and who are also free to at least some extent to set prices for the various lodging inventory within their control.

Accordingly, embodiments of the invention provide systems and methods for machine-based matching of lodging inventory from a plurality of disparate reservation provider systems. According to certain embodiments of the invention, a machine-based system is provided for correlating room types at a particular lodging facility using disparate information stored on various disparate network-connected lodging reservation provider computer systems. The system includes a network interface at least intermittently communicatively connected with a plurality of disparate network-connected lodging reservation computer systems over a network, the network interface receiving from the plurality of lodging reservation computer systems provider-formatted information sets. Each provider-formatted information set includes information identifying one of a plurality of rooms available for rent at a particular lodging facility, information identifying a price to rent that room, and information identifying a lodging reservation computer system offering that room at that price. The system also includes a first memory store configured to receive and store the provider-formatted information sets and a second memory store containing a database having a plurality of room definition sets defining characteristics of different classes of rooms available at the particular lodging facility. The system further includes a correlation system configured to access the memory stores and utilize information contained within the provider-formatted information sets and the room definition sets to correlate each of the provider-formatted information sets with one of the room definition sets. The correlation system is further configured to group provider-formatted information sets correlating with identical room definition sets together into individual groups. The system also includes a comparison system configured to compare the prices of all provider-formatted information sets within each individual group, to identify a lowest price within each individual group, and to output an identification of the provider-formatted information set and information from the room definition set correlated with the group as a room within each available room class having the lowest available price.

According to certain embodiments, the machine-based system further includes a room information system configured to parse the provider-formatted information sets and information from the room definition set for an available room class and to output a consumer-ready room description for the available room class using most-detailed information from among the provider-formatted information sets and the room definition set and using the lowest available price. The system may be configured to update the room definition set when the most-detailed information does not match the room description in the room definition set. In some instances, at least a portion of the consumer-ready room description is drawn from a provider-formatted information set not having the lowest price within that particular group.

The system may also include a consumer interface configured to receive a query from a consumer computing device and to output a price and description for the room within a room class having the lowest available price in response to the query from the consumer computing device. The system may be configured to output prices and descriptions for each room within a plurality of available room classes having the lowest available price for such room classes. When the system receives the query from the consumer computing device, the system may obtain the provider-formatted information sets, correlate and group the provider-formatted information sets into groups, and compare prices within each group, outputting prices and descriptions for the room in a plurality of available room classes having the lowest available price based on prices and availability information obtained within a few tens of seconds of receipt of the query from the consumer computing device, or in other words in real time or near-real time.

The system may include a reservation system that receives a selection of a room and consumer-identifying information from the consumer computing device, establishes a reservation connection with a low-price lodging reservation computer system associated with the lowest price for the room identified in the selection received from the consumer computing device, and places a reservation for the room with the low-price lodging reservation computer system using the consumer-identifying information. The system may be further configured to obtain updated provider-formatted information sets at least once after the reservation has been placed, identify available rooms within the same or better room class as the room class of the reservation using the correlation system, and identify rates available through various lodging reservation computer systems for the same or better room class using the comparison system to determine whether a room of the same or better room class of the reservation is available on the same date as the reservation but at a price lower than the price of the reservation. When a room of the same or better room class of the reservation is available on the same date as the reservation but at a price lower than the price of the reservation, the system may place a new reservation for the same date and same or better room class but at the lower price, and cancel the reservation previously made at the higher price.

The correlation system may include a machine-learning system trained on a data set of known correlations between a plurality of provider-formatted information sets and a plurality of room definition sets. The database in the second memory store of the system may include a historical listing of naming conventions identified as having been used by any of the plurality of lodging reservation provider computer systems for each room definition. The database in the second memory store may also include a historical track of prices for each room definition for each lodging reservation provider computer system. The system may be configured to update the historical listing of naming conventions when a changed naming convention is identified for one or more of the provider-formatted information sets. The system may also be configured to update the historical track of prices as varying prices are identified from the provider-formatted information sets.

Alternate embodiments of the invention provide a method for correlating room types using disparate information stored on various network-connected lodging reservation provider computer systems. The method may include connecting, over a computer network, to a plurality of disparate network-connected lodging reservation computer systems and obtaining, from the lodging reservation computers systems, a plurality of provider-formatted information sets. Each provider-formatted information set may include information identifying one of a plurality of rooms available for rent at a particular lodging facility, information identifying a price to rent that room, and information identifying a lodging reservation computer system offering that room at that price. The method may also include steps of storing the plurality of provider-formatted information sets in a first memory store of a computing device implementing the method for correlating room types and accessing a database in a second memory store of the computing device to obtain a plurality of room definition sets defining characteristics of different classes of rooms available at the particular lodging facility. The method may also include utilizing information contained within the provider-formatted information sets and the room definition sets to correlate each of the provider-formatted information sets with one of the room definition sets, grouping provider-formatted information sets correlated with identical room definition sets together into individual groups, and comparing the prices between the provider-formatted information sets within each individual group, identifying a lowest price within each individual group, and outputting the provider-formatted information set and information from the room definition set correlated with the group as a room within each available room class having the lowest available price.

The method may further include steps of parsing the provider-formatted information set and information from the room definition set for an available room class and outputting a consumer-ready room description for the available room class using most detailed information from among the provider-formatted information sets and the room definition set and the lowest available price. The method may also include a step of updating the room definition set when the most-detailed information does not match the room description in the room definition set. At least a portion of the consumer-ready room description may be drawn from a provider-formatted information set not having the lowest price within that particular group.

The method may also include receiving a query from a consumer computing device and outputting a price and description for the room within a room class having the lowest available price in response to the query from the consumer computing device. In some instances, the method includes outputting prices and descriptions for each room within a plurality of available room classes having the lowest available price for such room classes. The provider-formatted information sets may be obtained, correlated and grouped into groups, the prices within each group may be compared, and prices and descriptions for each room in a plurality of available room classes having the lowest available price in its respective room class may be outputted to the consumer computing device, all within a few tens of seconds of receipt of the query from the consumer computing device. In other words, these steps may be performed in real time or near-real time.

The method may include steps of receiving a selection of a room and consumer-identifying information from the consumer computing device, establishing a reservation connection with a low-price lodging reservation computer system associated with the lowest price for the room identified in the selection received from the consumer computing device, and placing a reservation for the room with the low-price lodging reservation computer system using the consumer-identifying information. The method may also include steps of obtaining updated provider-formatted information sets at least once after the reservation has been placed, identifying available rooms within the same or better room class as the room class of the reservation, and identifying rates available through various lodging reservation computer systems for the same or better room class by determining whether a room of the same or better room class of the reservation is available on a same date as the reservation but at a price lower than the price of the reservation. When a room of the same or better room class as the reservation is available on the same date as the reservation but at a price lower than the price of the reservation, a new reservation may be placed for the same date and the same or better room class but at the lower price and the reservation previously made at the higher price may be canceled.

The method may utilize a machine-learning system trained on a data set of known correlations between a plurality of provider-formatted information sets and a plurality of room definition sets. In the method, the database in the second memory store of the computing device may include a historical listing of naming conventions identified as having been used by any of the plurality of lodging reservation provider computer systems for each room definition. The database may also include a historical track of prices for each room definition for each lodging reservation provider computer system. The method may further include steps of updating the historical listing of naming conventions when a changed naming convention is identified for one or more of the provider-formatted information sets and updating the historical track of prices as varying prices are identified from the provider-formatted information sets.

In the description, references to a particular type of lodging facility or property (e.g., a hotel, a motel, or the like) should be understood as being used for descriptive convenience only, and should be understood as alternatively encompassing any type of lodging facility or property, unless the specific context clearly indicates otherwise. Similarly, references in the description to a particular reservable lodging unit (e.g., a room, suite, or the like) should be understood as being used for descriptive convenience only, and should be understood as alternatively encompassing any type of reservable lodging or accommodation unit, including rooms, suites, villas, apartments, campsites, beds in multi-bed units, etc.

Figure 1:
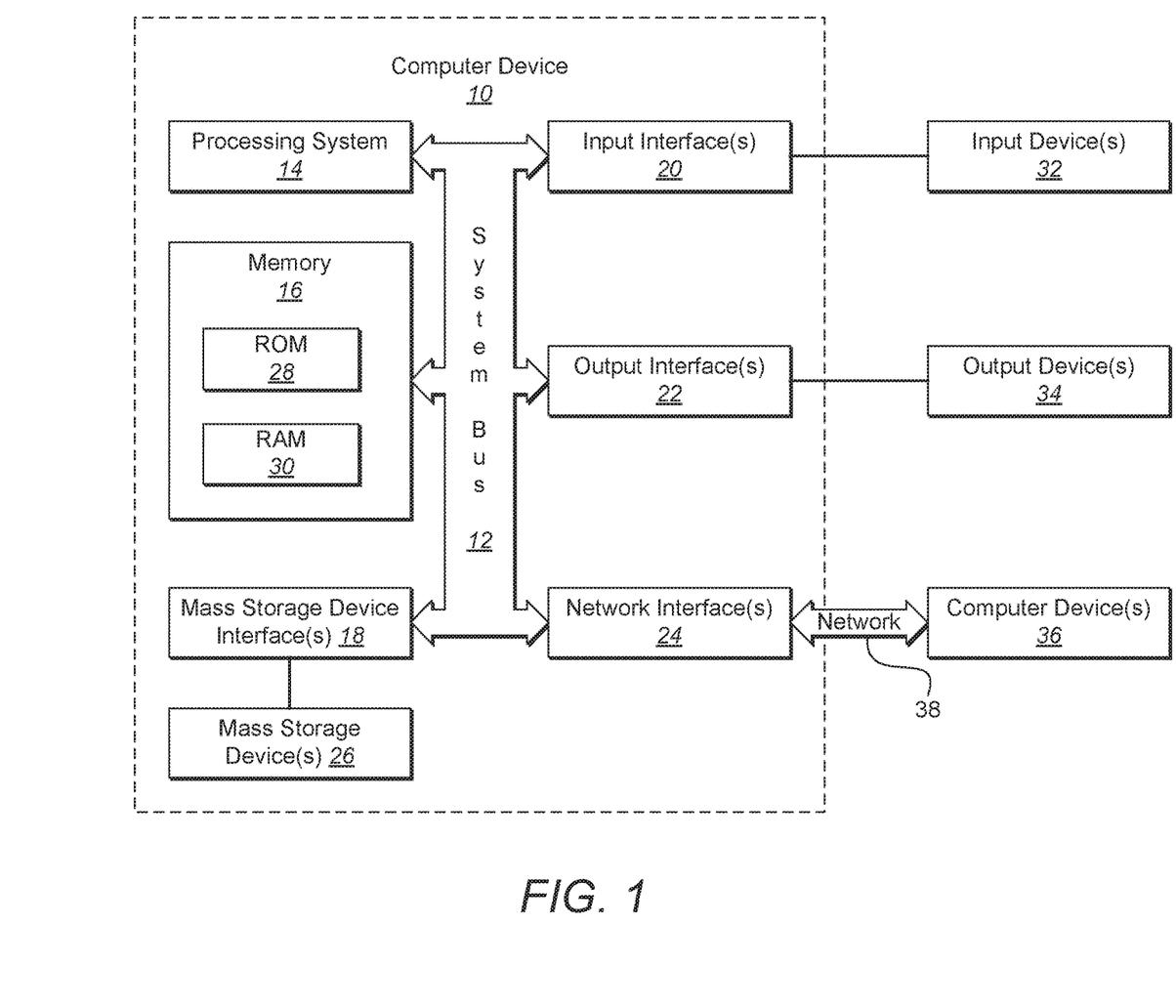
FIG. 1 shows a representative computer system for use with embodiments of the invention.

FIG. 1 and the corresponding discussion are intended to provide a general description of a suitable operating environment in which embodiments of the invention may be implemented, or with which embodiments of the invention may be used. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), stand alone electronic devices, and other such electronic environments.

Embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

With reference to FIG. 1, a representative system for implementing embodiments of the invention includes computer device 10, which may be a general-purpose or special-purpose computer or any of a variety of consumer electronic devices. For example, computer device 10 may be a personal computer, a notebook or laptop computer, a netbook, a personal digital assistant ("PDA") or other hand-held device, a smart phone, a tablet computer, a workstation, a minicomputer, a mainframe, a supercomputer, a multi-processor system, a network computer, a processor-based consumer electronic device, a computer device integrated into another device or vehicle, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer-readable media, such as on memory 16, a magnetic hard disk, a removable magnetic disk, a magnetic cassette, an optical disk, or from a communication connection, which may also be viewed as a computer-readable medium.

Memory 16 includes one or more computer-readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer-readable medium. Mass storage devices 26 and their corresponding computer-readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), an integrated circuit, a firewire (IEEE 1394), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen, a speaker, a printer, a multi-functional peripheral, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
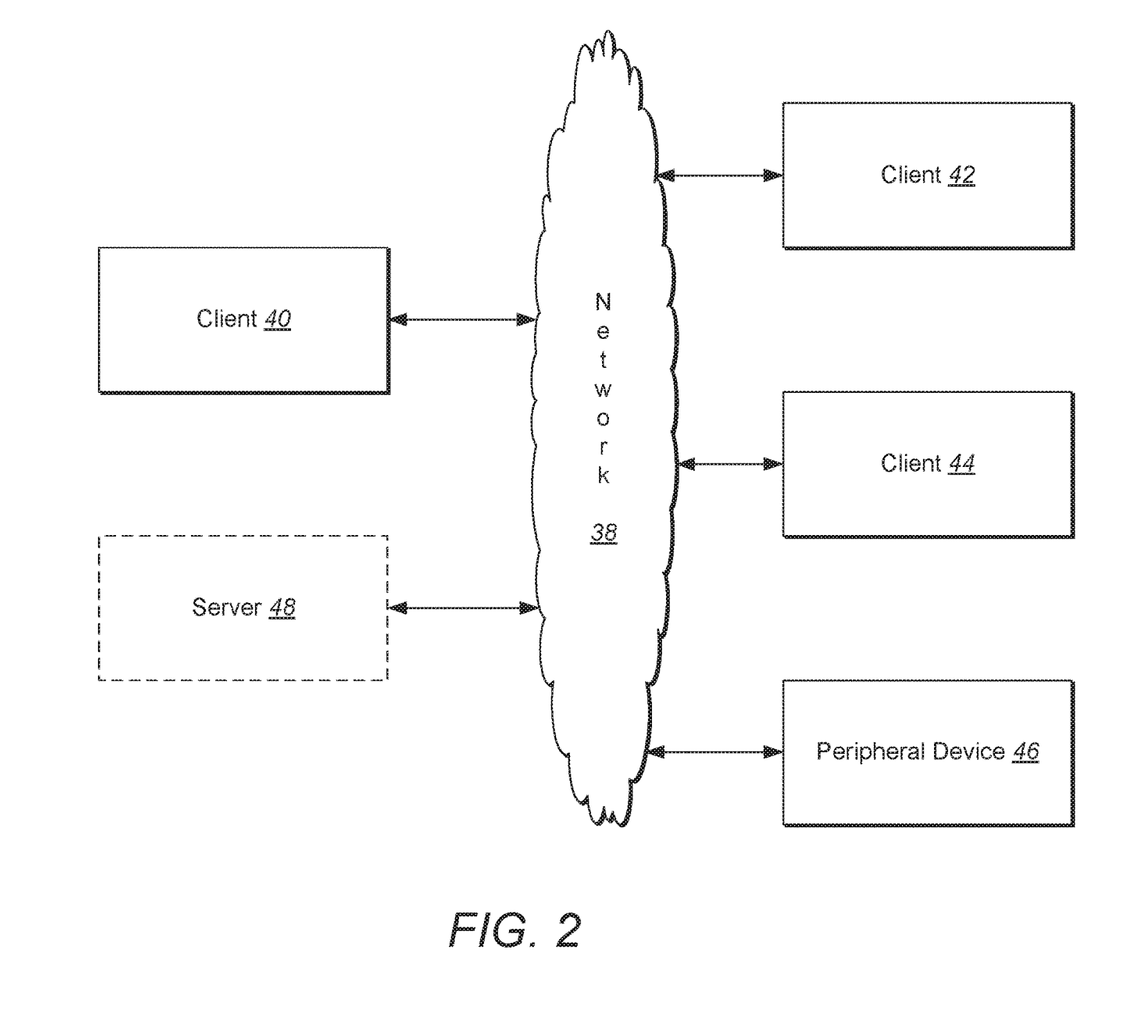
FIG. 2 shows a representative networked computer system for use with embodiments of the invention.

Thus, while those skilled in the art will appreciate that embodiments of the present invention may be practiced in a variety of different environments with many types of system configurations, FIG. 2 provides a representative networked system configuration that may be used in association with embodiments of the present invention. The representative system of FIG. 2 includes a computer device, illustrated as client 40, which is connected to one or more other computer devices (illustrated as client 42 and client 44) and one or more peripheral devices (illustrated as multifunctional peripheral (MFP) MFP 46) across network 38. While FIG. 2 illustrates an embodiment that includes a client 40, two additional clients, client 42 and client 44, one peripheral device, MFP 46, and optionally a server 48, which may be a print server, connected to network 38, alternative embodiments include more or fewer clients, more than one peripheral device, no peripheral devices, no server 48, and/or more than one server 48 connected to network 38. Other embodiments of the present invention include local, networked, or peer-to-peer environments where one or more computer devices may be connected to one or more local or remote peripheral devices. Moreover, embodiments in accordance with the present invention also embrace a single electronic consumer device, wireless networked environments, and/or wide area networked environments, such as the Internet.

Similarly, embodiments of the invention embrace cloud-based architectures where one or more computer functions are performed by remote computer systems and devices at the request of a local computer device. Thus, returning to FIG. 2, the client 40 may be a computer device having a limited set of hardware and/or software resources. Because the client 40 is connected to the network 38, it may be able to access hardware and/or software resources provided across the network 38 by other computer devices and resources, such as client 42, client 44, server 48, or any other resources. The client 40 may access these resources through an access program, such as a web browser, and the results of any computer functions or resources may be delivered through the access program to the user of the client 40. In such configurations, the client 40 may be any type of computer device or electronic device discussed above or known to the world of cloud computing, including traditional desktop and laptop computers, smart phones and other smart devices, tablet computers, or any other device able to provide access to remote computing resources through an access program such as a browser.

A system in accordance with embodiments of the invention may include one or more room matching servers in at least intermittent communicative connection with a plurality of reservation provider computing systems and in at least intermittent communicative connection with one or more consumer computing devices. The room matching server may include any combination of hardware, software, and firmware to provide systems in accordance with the disclosure herein, including network interfaces, memory stores, correlation systems, comparison systems, room information systems, and the like.

In embodiments of the invention, the system is trained to automatically perform room-type matching utilizing a machine learning process. Such processes are an area of ongoing research, and permit computers to learn without being explicitly programmed. A machine learning process permits a computing device (such as the server 48 discussed herein) to recognize patterns based on iterative learning process in which the computer itself determines the algorithms best suited to achieve desired results by way of making data-driven predictions or decisions. In a supervised learning procedure, the computer is presented with a data set (potentially a very large data set) of example inputs and desired outputs, and through a process using any of a variety of known approaches (e.g., clustering), the computer is trained until it is achieving a desired output success level (e.g., 90% success in pattern recognition). After each iteration, the computer is allowed to modify the algorithms it uses to sort or recognize data, and the results of each iteration are compared to inform the computer with respect to which modifications improve of decrease performance in the assigned task. Over time, the performance will improve to the point at which the computer can be allowed to perform its task on one or more additional sample sets (to verify performance in a still-controlled environment), and eventually to performing the desired task in the desired operating environment.

In the realm of room type matching, having the computer accurately and quickly perform room type matching allows the system to perform adequately and responsively with respect to consumer queries seeking a best available rate for a particular lodging property or facility on a particular date or dates. As is known in the art, lodging inventory and, to a lesser extent, pricing, can quickly change from day to day and hour to hour. So embodiments of the invention utilize real time or near-real time queries to reservation provider systems to determine up-to-date pricing and availability information for rooms (or other similar lodging equivalents) upon receipt of queries from consumers looking for lodging accommodations. Accordingly, to allow sufficient time for applicable searches for and retrieval of information from a variety of disparate systems, the system is able to perform the necessary comparison, correlation, and formatting functions within a few tens of seconds. Some information can be pre-searched and pre-loaded into the system, and comparisons and correlations may be performed on retrieved information, especially with respect to identifying varying descriptions utilized by various reservation providers with respect to the various classes of rooms. It is anticipated that room descriptions will typically not frequently change on most reservation provider systems, and it may even be possible to determine a scheduled time when updates to room and amenity naming conventions and descriptions normally occur, whereby the room matching system may be configured to time its attempts to obtain room and amenity naming conventions and descriptions at or shortly after such times.

Accordingly, the system may use methods that perform room-type matching functions at times other than peak times when the system normally receives a higher number of queries from consumers. Nevertheless, because room pricing and availability can be more volatile, it is anticipated that it will be advantageous to update at least room availability and pricing in real time or near real time, or in other words, in close temporal proximity (e.g., within a few tens of seconds to within a few minutes) to when the search is received from the consumer, to ensure that outdated availability and price information is not erroneously presented to the consumer.

When the computer system is initially trained, it is presented with one or more sets of provider-formatted information obtained from a plurality of lodging reservation computer systems, along with known correlations, matches, and/or groups which it is desired that the computer system should generate as output from the provider-formatted information sets. Accordingly, there is an initial labor-intensive process required to accurately identify inputs and desired results to be used in the machine learning process. It should be noted that the use of a machine learning process to accurately identify matching room types utilizing descriptions and information sets provided by a plurality of content providers (the reservation providers such as the hotels themselves, the OTAs, the wholesalers, and/or the aggregators) with their essentially unfettered ability to describe the various room classes in whatever way may be desired presents a particularly challenging task for the computer system. The complexity is further enhanced by the fact of a potentially large number of room types that may exist for each individual lodging property or facility. For example, resort/casino properties in Las Vegas may have eighty or more room types (based on size, view, beds, amenities, etc.) that may each be described differently by different reservation providers. Furthermore, the system should be capable of performing accurate room-type matching not just with a single lodging property or facility, but should be capable of proper function across the entire lodging industry served by the operator of the computer system (e.g., the travel agency acting as information and reservation aggregator). Accordingly, the representative data set used to train the computer system should be robust enough to accurately represent the range of manners in which lodging inventory can be described and otherwise represented in the industry.

Once the computer system is performing at a satisfactory level with respect to the sample data set and is able to identify and match room types among various reservation providers (e.g., at a 90% accuracy level, a 95% accuracy level, or any desired accuracy level), the performance of the system can be further tested by presenting the system with a new sample data set. The new sample data set ensures that the performance of the system is not limited in effectiveness to the original data set but can perform similarly with new data sets. Additional data sets may be presented to the system as needed to verify and ensure proper performance of the system. Additional training of the system can continue to occur even after the system is in actual use to further refine accuracy of the room type matching performed by the system.

In some embodiments of the invention, the room type matching system additionally or alternately utilizes a database of past information sets applied to room classes by various reservation providers. The database of past information may include any information applied by or used by reservation providers in the marketing of various room classes, and may provide an alternative basis by which the system can associate and match rooms even as some portions of descriptions change. By way of examples, the database may include information such as room photographs, room descriptions, amenity descriptions, room nomenclature, amenity nomenclature, room prices, and the like, dates during which such information was applicable to the room class of interest, and the reservation provider or providers using such information. The database may serve as a ledger of information that may be referred to when new information is presented by a reservation provider, when information is changed by a reservation provider, or when a new reservation provider enters the marketplace.

For example, if an existing reservation provider determines to change its room descriptions, such as when a new channel manager is hired, some information in the room description may either be slow to change or may not change at all. For example, a square footage measurement for the room will not likely change regardless of changes relating to other descriptive features of the room. As another example, whether or not a room has a view will not typically change, nor will its bed configuration. Similarly, all or a portion of a list of room amenities may be resistant to change and may remain in place regardless of other changes to a room description. Additionally, while a lodging property or facility may occasionally modify its room classes somewhat as a result of remodeling efforts or addition of room amenities, such occurrences may generally be rare, so even when room information (e.g., descriptions, etc.) change, the system can generally compare its existing knowledge of the number and type of room classes for a particular property or facility and can proceed under a general presumption that the number and type of room classes has remained the same and can use this information as well as the historical information contained in the database to assist in mapping the new descriptions to the known room classes.

The database of past information that serves as a ledger of information used by the room type matching system may optionally be made public so that the information is made available to lodging providers and reservation providers. The lodging providers and reservation providers may optionally be permitted to submit changes to the database of past information to ensure that the database is maintained and fully up-to-date, which may further enhance the functionality of the database and its use by the room type matching system. The use of a publicly available ledger of information such as room descriptions and pricing information may help to eliminate inefficiencies in the marketplace, such that the competitive frontier shifts to how fast various reservation providers and/or aggregators can process and revenue optimize data. The historical data relating to room pricing may also allow for better decision making relating to revenue maximization. Changes to nomenclature or naming conventions that may occur will no longer be able to adversely impact pricing models because the system will be able to match and include all relevant reservation sources and will know best price sources immediately, thereby permitting providers to capitalize on inefficiencies and arbitrage windows much more quickly than in the past, reducing arbitrage windows from days to weeks down to hours and minutes.

Figure 3:
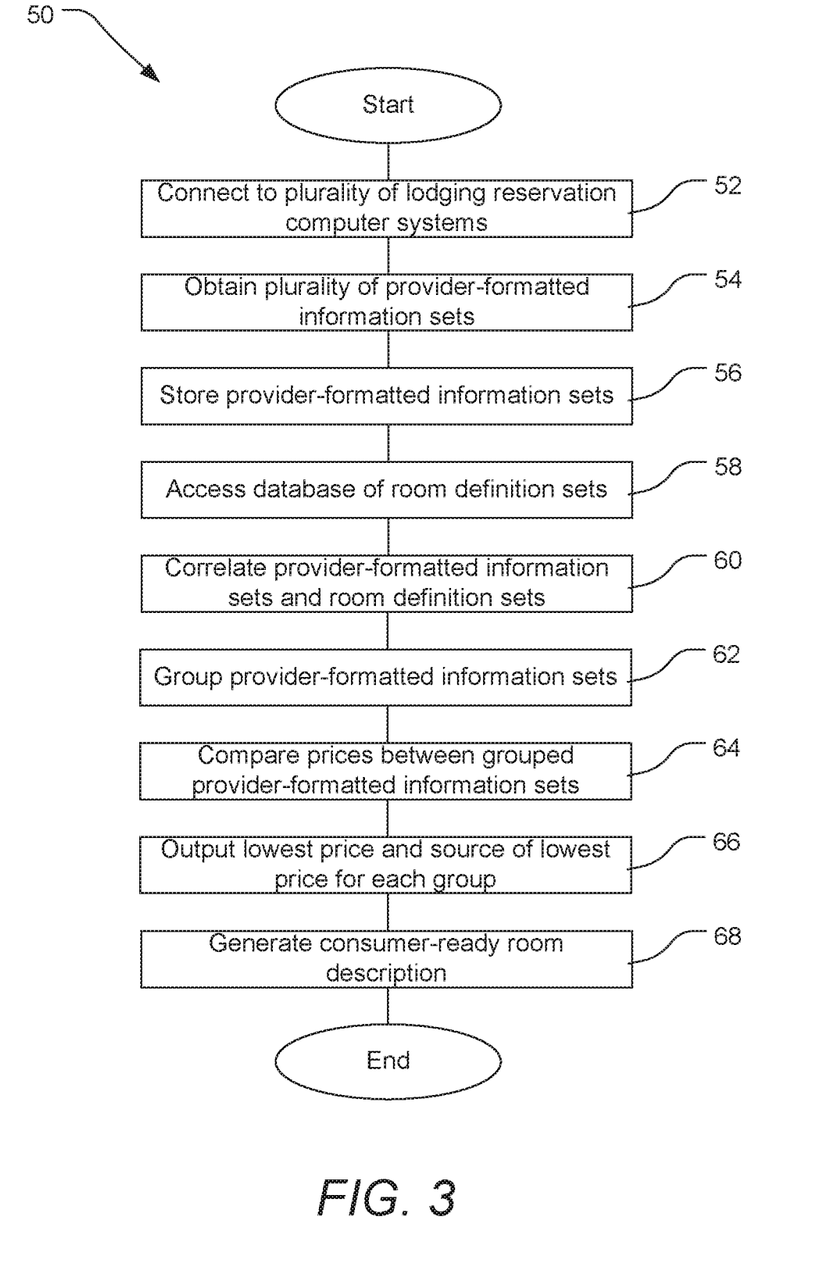
FIG. 3 shows an exemplary method that may be performed by a system once the system has been configured to identify and match room types as described herein.

FIG. 3 illustrates an exemplary method 50 that may be performed by the system once the system has been configured to identify and match room types as described above. The method 50 illustrated in FIG. 3 may occur upon receipt of a search inquiry received from a consumer (e.g., through a consumer computing device and over a network), or may be performed on a set schedule (e.g., daily, weekly, hourly, or on a schedule adapted to maximize the ability to capture changes to reservation providers' description of rooms and/or anticipated pricing or availability changes. As another alternative, given the large number of information sources, the method 50 may be essentially continuously performed, rotating among obtaining information from various reservation providers and with respect to various lodging facilities or properties to ensure that information any particular lodging facility or property and with respect to any particular reservation provider is relatively up-to-date. Then, as needed, the continuous update process may be When the method 50 is performed (or results are updated) upon receipt of an inquiry from a consumer, the method 50 (or at least that portion relevant to the consumer's search) may be performed sufficiently quickly (e.g., within a period no longer than a few tens of seconds) to ensure that the consumer has an adequate consumer experience when searching for lodging accommodations. The method begins at step 52, where the system connects to a plurality of lodging reservation computer systems. In some instances, the system may remain continuously connected to the lodging reservation computer systems, in which case step 52 may occur upon initialization of the system or shortly after a loss of a prior connection. Alternatively, a connection is established only when the method 50 is performed.

At step 52, the connection is used for the system to obtain a plurality of provider-formatted information sets. This step may involve the system performing one or more queries of the lodging reservation computer systems in an automated fashion (e.g., using a front-end system similar to the manner in which a consumer would query the applicable lodging reservation computer systems, or alternatively using a dedicated back-end system) relevant to the query originally performed by the consumer. As the system receives provider-formatted information sets from the lodging reservation computer systems, these provider-formatted information sets are stored by the system at step 56. As discussed above, the provider-formatted information sets may include a variety of information relating to rooms at one or more lodging facilities or properties, including room descriptions, amenity descriptions, price points for one or more relevant dates, room images, and the like. The provider-formatted information sets may include information provided and formatted by the lodging providers themselves, as well as information provided and formatted by the reservation providers.

As provider-formatted information sets are received, or alternatively once all relevant provider-formatted information sets have been received, steps 58-62 of the method may be performed. In step 58, the system accesses a database of room definition sets maintained by the system. In step 60, the system correlates each provider-formatted information set with one of the room definition sets, thereby identifying which room definition set each provider-formatted information set corresponds to. In step 62, the system groups all provider-formatted information sets that correspond to an identical room definition set together into groups, thereby matching provider-formatted information sets from different reservation providers together as relating to matching room classes (e.g., representing an identical reservation opportunity but through different reservation providers). Once these steps have been performed for all provider-formatted room definition sets, the system has effectively performed room type matching for all results of its queries to the lodging reservation computer systems.

At this point, the system is able to compare the prices in each group to identify the provider-formatted information sets (and thus the lodging reservation computer systems) having a lowest price for each room class on each available reservation date at step 64, and can output the lowest price and the source of the lowest price for use in making a reservation for the consumer. In some embodiments, the system may be configured to assemble a composite reservation formed using reservations shorter than the entire length of the stay but made through different reservation providers and lodging reservation computer systems so as to minimize the total price to the consumer.

To present the search results to the consumer, the system may output a final total price for one or more room classes (based on the parameters of the consumer's search) to the consumer (e.g., using a communication sent over the network to the consumer's consumer computing device), along with a consumer-ready room description of the room class associated with each price. As the room description (including any applicable photographs) for each room class may vary between the various reservation providers and lodging reservation computer systems, the system may generate a consumer-ready room description at step 68, using information from the database of room definition sets, as well as some portion of the plurality of provider-formatted information sets.

By way of example, it can be preferable to provide the consumer, upon demand, with a maximum quantity of information about the room class being reserved. Accordingly, the system may generate the consumer-ready room descriptions by obtaining a maximum amount of detail from the various room definition sets and provider-formatted information sets when generating the consumer-ready room description. As another alternative, it may be desired to provide some other level of descriptive information, and the consumer-ready room description may be formatted and information obtained accordingly. In some instances, potential lodging information obtained from business-to-business channels is replaced by richer content obtained from business-to-consumer channels. In some instances, information thus contained in the consumer-ready room description may not match the information originally contained in the provider-formatted information set associated with the final reservation (in other words from the provider-formatted information set of the lodging reservation computer system through which the reservation is eventually placed), but may be drawn at least in part from a provider-formatted information set of another lodging reservation computer system or from a room definition set.

In some instances, it may be advantageous to update the room definition sets to include the consumer-ready room descriptions generated by the system so they will be available for ready use in response to future consumer inquiries without being generated on the fly. Accordingly, the room definition sets, which may be contained in a database, including in a public database as discussed above, may be updated as necessary as additional or more information is obtained from lodging providers and/or reservation providers as a result of queries to and from the system. Additionally or alternatively, lodging providers may be provided with an opportunity to view and revise information contained in the room definition sets pertaining to the consumer-ready room description to ensure accuracy and that the information being provided to the consumer is in accordance with the lodging provider's desired image.

When results are provided to the consumer, they may be provided with respect to a single room class at a single lodging property or facility (e.g., a particular room class of the Hotel Brand A at City A), with respect to multiple room classes at a single lodging property or facility (e.g., a subset of or all room classes of the Hotel Brand B at City B), with respect to a single room class at multiple lodging properties or facilities (e.g., a lowest-price room class of Motel Brand C at City C and a lowest-price room class of Motel Brand D also at City C), or with respect to multiple room classes at multiple lodging properties or facilities (e.g., a subset of or all room classes of Hotel Brand E at City E and a subset of or all room classes of Motel Brand F also at City E). Accordingly, embodiments of the invention are capable of ensuring a lowest total price to the consumer for any particular room class at an individual lodging facility or property, or to provide the consumer options for the lowest total price at a plurality of available facilities. When the consumer selects to place a reservation, the system utilizes the information received from the consumer as well as the information received from the lodging reservation computer systems to place one or more reservations (e.g., a single reservation or a composite reservation) through the applicable reservation provider or providers.

Embodiments of the invention may provide ongoing benefits to the consumer by continuing to monitor the price associated with previously made reservations to obtain a lower total price where possible. In some such embodiments, if the system determines that a lower total price can be obtained for the same room class by rebooking the reservation or some portion thereof through one or more of the reservation providers (e.g. after performing an update of method 50), the system can place a new reservation on behalf of the consumer and can cancel the old reservation. In alternative such embodiments, if the system determines that a lower total price can be obtained for the same or better room class by rebooking the reservation through one or more reservation providers (in the case of a better room class, the system may optionally determine to rebook the reservation only when the lower total price can be achieved for the whole reservation so the whole reservation is at the better room class), the system can place a new reservation on behalf of the consumer and can cancel the old reservation.

Accordingly, embodiments of the invention provide for room class matching across a plurality of reservation provider systems, whereby an accurate comparison of rates from the providers can be made to minimize the price at which reservations are placed by consumers.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A machine-based system for correlating room types at a particular lodging facility using disparate information stored on various disparate network-connected lodging reservation provider computer systems, the system including instructions that, when executed by one or more processors, causes the system to:
    receive, from a plurality of lodging reservation computer systems, a plurality of provider-formatted information sets, each provider-formatted information set comprising:
    a provider-specific description of a room available for rent at a corresponding lodging facility, the provider-specific description of the room including a description of the room generated by a reservation provider associated with a corresponding lodging reservation computer system; and
    price information for the room;
    store the provider-formatted information sets in a first memory store;
    access a database of a second memory store to obtain a plurality of room definition sets, each room definition set including characteristics of a corresponding room class;
    apply a correlation model to the plurality of provider-formatted information sets to correlate each of the plurality of provider-formatted information sets with one of the plurality of room definition sets, wherein the correlation model includes a machine learning system trained to receive as input a given provider-formatted information set along with one or more of known correlations, matches, or groups and output one of a plurality of room definition sets determined to correlate with the given provider-formatted information set;
    generate, based on the outputs of the correlation model, groupings of provider-formatted information sets associated with corresponding room definition sets, the grouping of provider-formatted information sets including subsets of provider-formatted information sets including subsets of provider-formatted information sets associated with different room classes; and
    identify, for each subset of the provider-formatted information sets, a lowest priced provider-formatted information set, and to output, for each subset, price information from the lowest priced provider-formatted information set and information from the room definition set.

2. The machine-based system as recited in claim 1, further comprising instructions that, when executed by the one or more processors, causes the system to parse the plurality of provider-formatted information sets and information from the plurality of room definition sets to identify an available room class and to output a consumer-ready room description for the available room class using most-detailed information from among an associated grouping of the plurality of provider-formatted information sets and the associated room definition set and using the lowest available price.

3. The machine-based system as recited in claim 2, further comprising instructions that, when executed by the one or more processors, causes the system to update the plurality of room definition sets when the most-detailed information does not match the room description in the associated room definition set.

4. The machine-based system as recited in claim 2, wherein at least a portion of the consumer-ready room description is drawn from a provider-formatted information set not having the lowest price within the associated grouping of the plurality of provider-formatted information sets.

5. The machine-based system as recited in claim 1, further comprising instructions that, when executed by the one or more processors, causes the system to provide a consumer interface configured to receive a query from a consumer computing device and to output a price and description for the room within a room class having the lowest available price in response to the query from the consumer computing device.

6. The machine-based system as recited in claim 5, further comprising instructions that, when executed by the one or more processors, causes the system to:
    receive a selection of a room and consumer-identifying information from the consumer computing device;

establish a reservation connection with a low-price lodging reservation computer system associated with the lowest price for the room identified in the selection received from the consumer computing device; and place a reservation for the room with the low-price lodging reservation computer system using the consumer-identifying information.

7. The machine-based system as recited in claim 6, further comprising instructions that, when executed by the one or more processors, causes the system to:

obtain updated provider-formatted information sets at least once after the reservation has been placed;

identify available rooms within the same or better room class as the room class of the reservation;

identify rates available through various lodging reservation computer systems for the same or better room class to determine whether a room of the same or better room class of the reservation is available on the same date as the reservation but at a price lower than the price of the reservation; and when a room of the same or better room class of the reservation is available on the same date as the reservation but at a price lower than the price of the reservation:

place a new reservation for the same date and same or better room class but at the lower price; and cancel the reservation previously made at the higher price.

8. The machine-based system as recited in claim 1, wherein the machine-learning system is trained on a data set of known correlations between a plurality of provider-formatted information training sets and a plurality of room definition training sets.

9. The machine-based system as recited in claim 1, wherein the database in the second memory store comprises:

a historical listing of naming conventions identified as having been used by any of the plurality of lodging reservation provider computer systems for each room definition;

a historical track of prices for each room definition for each lodging reservation provider computer system; and further comprising instructions being executable by the one or more processors to cause the system to:

update the historical listing of naming conventions when a changed naming convention is identified for one or more of the plurality of provider-formatted information sets; and update the historical track of prices as varying prices are identified from the plurality of provider-formatted information sets.

10. A method for correlating room types using disparate information stored on various network-connected lodging reservation provider computer systems, the method comprising:

connecting, over a computer network, to a plurality of lodging reservation computer systems;

obtaining, from the plurality of lodging reservation computers systems, a plurality of provider-formatted information sets, each provider-formatted information set comprising:

a provider-specific description of a room available for rent at a corresponding lodging facility, the provider-specific description of the room including a description of the room generated by a reservation provider associated with a corresponding lodging reservation computer system; and price information for the room;

storing the plurality of provider-formatted information sets in a first memory store;

accessing a database in a second memory store to obtain a plurality of room definition sets, each room definition set including characteristics of a corresponding room class;

applying a correlation model to the plurality of provider-formatted information sets, the correlation model being trained to correlate each of the plurality of provider-formatted information sets with one of the plurality of room definition sets along with one or more of known correlations, matches, or groups;

generating, based on outputs of the correlation model, groupings of provider-formatted information sets associated with corresponding room definition sets, the grouping of provider-formatted information sets including subsets of provider-formatted information sets including subsets of provider-formatted information sets associated with different room classes; and identifying, for each subset of provider-formatted information sets, a lowest priced provider-formatted information set, and outputting, for each subset, price information from the lowest priced provider-formatted information set and information from the room definition set.

11. The method as recited in claim 10, further comprising parsing the plurality of provider-formatted information sets and information from the plurality of room definition sets to identify an available room class and to output a consumer-ready room description for the available room class using most-detailed information from among an associated grouping of the plurality of provider-formatted information sets and the associated room definition set and using the lowest available price.

12. The method as recited in claim 11, further comprising updating the plurality of room definition sets when the most-detailed information does not match the room description in the associated room definition set.

13. The method as recited in claim 11, wherein at least a portion of the consumer-ready room description is drawn from a provider-formatted information set not having the lowest price within the associated grouping of the plurality of provider-formatted information sets.

14. The method as recited in claim 10, further comprising providing a consumer interface to receive a query from a consumer computing device and outputting a price and description for the room within a room class having the lowest available price in response to the query from the consumer computing device.

15. The method as recited in claim 14, further comprising:

receiving a selection of a room and consumer-identifying information from the consumer computing device;

establishing a reservation connection with a low-price lodging reservation computer system associated with the lowest price for the room identified in the selection received from the consumer computing device; and placing a reservation for the room with the low-price lodging reservation computer system using the consumer-identifying information.

16. The method as recited in claim 15, further comprising:

obtaining updated provider-formatted information sets at least once after the reservation has been placed;

identifying available rooms within the same or better room class as the room class of the reservation;

identifying rates available through various lodging reservation computer systems for the same or better room class by determining whether a room of the same or better room class of the reservation is available on a same date as the reservation but at a price lower than the price of the reservation; and when a room of the same or better room class as the reservation is available on the same date as the reservation but at a price lower than the price of the reservation:

placing a new reservation for the same date and the same or better room class but at the lower price; and canceling the reservation previously made at the higher price.

17. The method as recited in claim 10, wherein the database in the second memory store comprises:

a historical listing of naming conventions identified as having been used by any of the plurality of lodging reservation provider computer systems for each room definition;

a historical track of prices for each room definition for each lodging reservation provider computer system;

wherein the method further comprises:

updating the historical listing of naming conventions when a changed naming convention is identified for one or more of the plurality of provider-formatted information sets; and updating the historical track of prices as varying prices are identified from the plurality of provider-formatted information sets.

\* \* \* \* \*